United States Patent [19]

Lancesseur

[11] Patent Number: 4,623,368

[45] Date of Patent: Nov. 18, 1986

[54] ABSORBING AND ESPECIALLY DEHYDRATING CAPSULE

[76] Inventor: Bernard Lancesseur, Les Courtils, 41200 Pruniers, France

[21] Appl. No.: 683,815

[22] Filed: Dec. 20, 1984

[51] Int. Cl.⁴ .............................................. B01D 53/04
[52] U.S. Cl. ........................................ 55/387; 55/512
[58] Field of Search ........................ 55/387, 516–519, 55/512; 210/282

[56] References Cited

U.S. PATENT DOCUMENTS

| | | | |
|---|---|---|---|
| 1,077,181 | 10/1913 | Winborn | 55/387 X |
| 1,770,974 | 7/1930 | Everett | 55/518 X |
| 2,199,258 | 4/1940 | Gray | 55/387 X |
| 2,325,657 | 8/1943 | Burkness | 55/387 X |
| 2,557,277 | 6/1951 | Gibson | 55/387 X |
| 2,702,089 | 2/1955 | Engelder | 55/515 X |
| 2,852,326 | 9/1958 | Westlake, Jr. | 55/387 X |
| 3,240,567 | 3/1966 | Caparreli et al. | 55/387 X |
| 3,820,309 | 6/1974 | Cullen et al. | 55/387 |
| 4,333,752 | 6/1982 | Thies et al. | 55/387 |
| 4,397,663 | 8/1983 | Michlin et al. | 55/387 |

FOREIGN PATENT DOCUMENTS

| | | | |
|---|---|---|---|
| 658166 | 2/1963 | Canada | 55/387 |
| 66379 | 2/1948 | Denmark | 55/387 |
| 452414 | 5/1913 | France . | |
| 2025430 | 9/1970 | France . | |
| 2040167 | 8/1980 | United Kingdom . | |

Primary Examiner—Robert Spitzer
Attorney, Agent, or Firm—Gottlieb, Rackman & Reisman

[57] ABSTRACT

An absorbent capsule is provided formed from an appropriate, generally cylindrical, plastic material element. The bottom of said element containing the dehydrating product is pierced with at least one slit sufficiently thin so that there is no risk of the dehydrating product contained from escaping therethrough; for this, said bottom may comprise a narrow strip in the form of a dydedron whose apex is inside said element and is slit so as to form said slit.

5 Claims, 6 Drawing Figures

U.S. Patent    Nov. 18, 1986    4,623,368
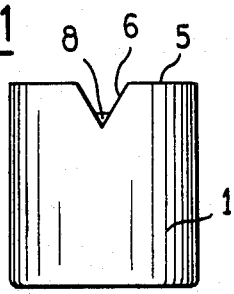
FIG_1
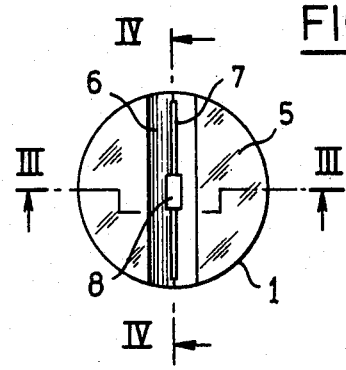
FIG_2
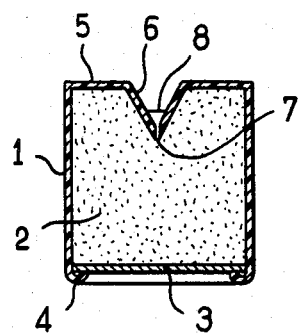
FIG_3
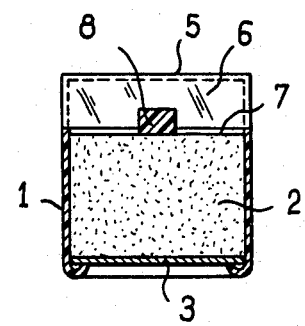
FIG_4
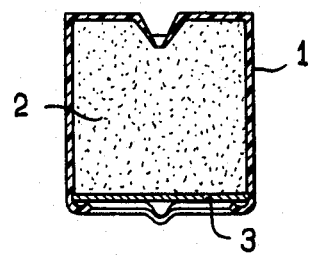
FIG_5
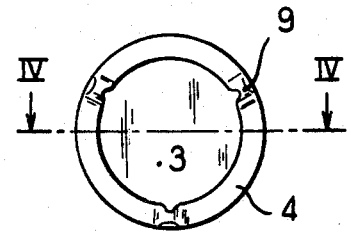
FIG_6

ABSORBING AND ESPECIALLY DEHYDRATING CAPSULE

BACKGROUND OF THE INVENTION

Presently known dehydrating or smell absorbing capsules are formed from an appropriate plastic material element, generally symmetrical, which is filled with a suitable absorbent and more especially dehydrating material which is held in place by a permeable cardboard disk.

These capsules are sealingly packed and sent to the user, for example a manufacturer of pharmaceutical products, who inserts them in his packagages for protecting his medicament or other product.

The reproach made against these capsules is that the absorption of humidity or smells is too slow through the cardboard disk, on which is generally printed in red, and in different languages: "Do not swallow", so as to avoid accidents, which absorption being possibly slower if the capsule has been placed upside down in the jars, bottles or boxes in which its power of absorption is to be exercised, that is to say with the cardboard disk on the side opposite that where the products in question are situated.

SUMMARY OF THE INVENTION

The present invention provides then an absorbent capsule of the above mentioned type which avoids the disadvantages thereof and which differs therefrom in that its bottom is pierced with at least one slit sufficiently thin so that there is no risk of the absorbent product contained from escaping.

To make sure of this result, the flat bottom of the capsule comprises a narrow strip in the shape of a dihedron whose apex is inside said element and replaced by said slit.

The absorption of said humidity or smells through this slit is much more satisfactory than through the cardboard disk of said prior art capsules and if, by negligence, the capsules are placed upside down in the jar, bottle or box intended to receive them, they still provide a better result than with the capsules of a known type when these latter are placed in the correct direction, since the absorption takes place, as in these latter, through the cardboard disk but also partly through the slit.

So that the humidity can always pass through the permeable cardboard disk, even if this latter should accidently rest on an impermeable surface inside the package which the capsule is intended to protect, studs may be provided, for example three in number, extending the cylindrical element forming the capsule, beyond its permeable disk, thus providing therebetween a passage for the humidity or dampness, which may thus penetrate into the free space which they have created between the permeable cardboard disk and said impermeable surface.

BRIEF DESCRIPTION OF THE DRAWINGS

The accompanying drawings show by way of example two embodiments of the capsule of the invention.

FIG. 1 is an elevational view of a first embodiment of such a capsule,

FIG. 2 is a plan view of the bottom of the element intended to receive the dehydrating product, FIG. 3 is a longitudinal sectional view along the broken line III—III of FIG. 2, FIG. 4 is a similar view along line IV—IV of the same FIG. 2, FIG. 5 is a longitudinal sectional view along line V—V of FIG. 6, of a second embodiment of such a capsule, and, FIG. 6 is a plan view of this capsule, on the cardboard disk side.

DESCRIPTION OF THE PREFERRED EMBODIMENTS

The capsules shown comprise a cylindrical element 1, made from an appropriate plastic material, which, after filling with the dehydrating product 2, is then sealed by a permeable cardboard disk 3 which is held in position by the flanged edge 4 of the cylindrical element 1; the bottom 5 of this cylindrical element, instead of being entirely flat, like that of known dehydrating capsules, comprises a diametrical strip in the shape of dihedron 6, whose apex, inside the cylindrical element 1, is slit; with such an arrangement there is obviously no risk of the dehydrating product 2 escaping through this slit 7; it may moreover be interrupted in its central part by a small plastic material stud 8 which joins together the two edges thereof.

In the embodiment shown in FIGS. 5 and 6, so that the humidity or dampness may be absorbed through the permeable cardboard disk, even when it is accidentally placed in the package in which it is intended to absorb the humidity with its permeable cardboard disk 3 applied to an impermeable surface, of the package for example, a number of projections or studs 9, 3 for example, are provided on the flanged edge 4 of the cylindrical element 1 forming the capsule, holding the permeable cardboard washer, said projections being intended to let the humid air pass through between them and penetrate through the empty space which they create between the cardboard disk and the flanged edge, on the one hand, and the impermeable surface on which it is assumed to rest on the other, said humid air thus being able to pass through the permeable cardboard disk for absorption by the dehydrating product contained in the capsule.

This flanged edge 4 and these projections 9 may be obtained simultaneously, in a single operation, when the disk is crimped to the edge of the cylindrical element 1 of the capsule.

The two embodiments of the invention which have been described above with reference to the accompanying drawings are of course given purely by way of indication and are in no wise limiting since numerous modifications may be made without departing from the scope and spirit of the present invention; thus more particularly the plastic material element receiving the dehydrating product may have another shape than that of a cylinder, said projections 9 may be in any number and may be formed in another way than the one mentioned.

What is claimed is:

1. An absorbing capsule comprising:
   a housing element filled with a dehydrating material and made from a plastic material, said element having a first open end and a second closed end, said closed end having a narrow strip in the shape of a dihedron and including an apex region, said apex region inside said housing element and being in the form of a slit, said slit being sized to prevent said dehydrating material from leaving said housing element;

and a substantially permeable cardboard cover element for covering said open end.

2. The capsule as claimed in claim 1, wherein said open end has a flanged edge, said cover element being held in a covering position by said flanged edge of said open end.

3. The capsule as claimed in claims 1 or 2, wherein said housing element is cylindrical.

4. The capsule as claimed in claims 1 or 2, wherein the edge of said open end includes a plurality of projections extending beyond said cover element.

5. The capsule as claimed in any one of claims 1 or 2, wherein said slit is interrupted in its central part by a plastic material stud which joins its two edges together.

* * * * *